July 15, 1930. T. M. ROYAL 1,770,865
METHOD OF MANUFACTURING BAGS
Original Filed April 11, 1928 2 Sheets-Sheet 1
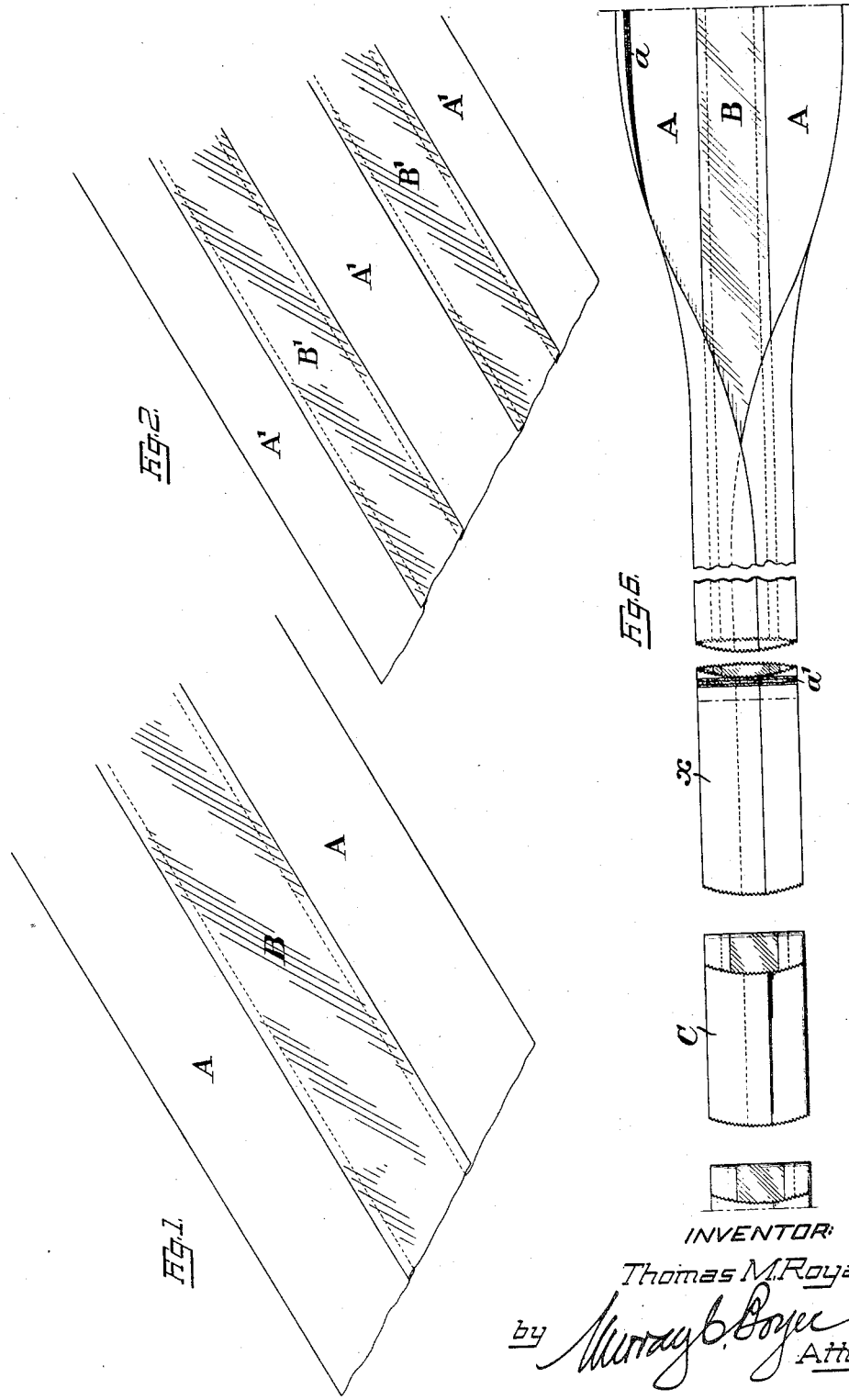
INVENTOR:
Thomas M. Royal,
by Murray B. Boyer
Atty.

July 15, 1930.   T. M. ROYAL   1,770,865
METHOD OF MANUFACTURING BAGS
Original Filed April 11, 1928   2 Sheets-Sheet 2
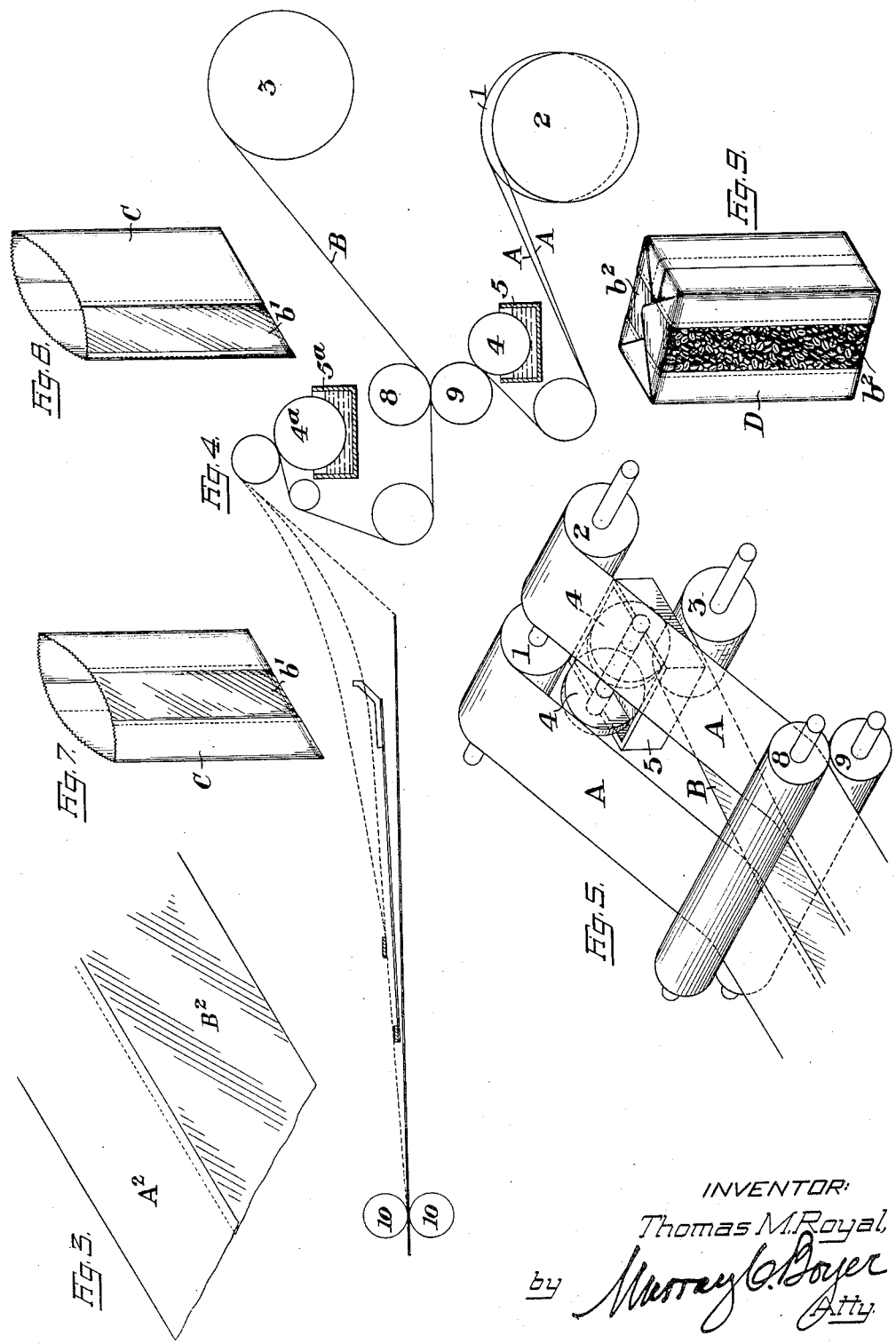
INVENTOR:
Thomas M. Royal,
by Murray C. Boyer
Atty.

Patented July 15, 1930

1,770,865

UNITED STATES PATENT OFFICE

THOMAS M. ROYAL, OF PHILADELPHIA, PENNSYLVANIA

METHOD OF MANUFACTURING BAGS

Original application filed April 11, 1928, Serial No. 269,231. Divided and this application filed March 21, 1929. Serial No. 348,858.

My invention relates to the manufacture of bags and similar containers of a type employed for packaging articles wherein it is desirable that the contents of the bag or other container may be viewed through a wall of the same. Such bag may be made of any suitable form of paper, fabric or other sheet material as to its greater extent but in order that a view of the contents may be obtained, I have combined therewith a section of transparent material, preferably highly transparent, which may be of any well-known cellulosic type, and in the present instance I have employed a commercial product widely used which may be termed "cellulose hydrate."

It is my desire to provide a composite material which will have one or more highly transparent zones or areas extending throughout the length thereof, and which may be employed in unit sections in the formation of bags and/or similar containers whereby the contained goods may be exposed to view. Such composite bag material may be prepared and utilized at much less cost than the continuous sheets of highly transparent material heretofore employed. In the manufacture of machine-made bags and similar containers, it is very expensive to manufacture them exclusively of transparent material of the character indicated. Furthermore, such material is too expensive for use with many commodities desirable to be sold in bag form.

One object of my present invention is the production of a composite sheet of material in continuous lengths; which material, upon its formation, may be delivered to a bag machine of any standard or usual type; such composite sheet being entirely flexible and capable of being successfully passed through bag machines of the usual type.

The principal object of my invention is to produce containers in the form of bags made from such improved composite sheet material, which includes at least one part or section which is transparent, preferably highly so, while the other part thereof consists of a strip or strips of paper or other suitable material; such bags having a highly transparent panel in at least one wall of the same extending from end to end of such bag and being preferably formed upon machines of the usual or ordinary type and the transparent material employed being susceptible of manipulation by the bag-forming means of such machines without damage or deformation.

Bags having a single transparent portion or zone which extends throughout the length of the wall of such bag are available for use in the packaging of many articles of food, delicate fabrics and other vendible articles and will have a distinct value in that the presence of such transparent portion will permit inspection of the contents and enable the purchaser to be apprised of the character thereof without handling the same and thereby soiling the fingers. Such condition is fulfilled if only a continuous portion of one side or wall of the bag is transparent and my invention includes the method of making a bag having one wall; a continuous portion of one wall, or a plurality of its walls, provided with zones or areas of transparent material which extend throughout the length of the bag.

In carrying my invention into effect, I provide means whereby such composite material may be assembled and permanently connected in advance of the tube-forming mechanism of bag machines; the tube (or tubes) produced thereby being fed continuously to the usual mechanism for severing the same into blanks and successively turning one end of such blanks to complete the bags.

These and other features of my invention are more fully described hereinafter; reference being had to the accompanying drawings illustrating a manner in which my improved method or process may be carried into effect and in which:

Figure 1 is a perspective view illustrating a portion of one form or type of composite sheet material which may be employed in the manufacture of bags in accordance with my invention.

Figs. 2 and 3 are similar views illustrating other types of composite sheet material within the scope of my invention from which bags may be made.

Fig. 4 is a diagrammatic view illustrating one manner of assembling and joining together the separate strips of material forming the composite sheet from which my improved bags may be made.

Fig. 5 is a diagrammatic view in perspective illustrating another manner of preparing a composite sheet from which my improved bags may be made.

Fig. 6 is a diagrammatic illustration of the progress of the composite sheet from the forming means to the finished bags.

Figs. 7 and 8 are perspective views of bags made from one form of composite sheet material within the scope of my invention, and Fig. 9 is a perspective view of another bag construction within the scope of my invention.

My improved composite bag-forming material may be made of a section or sections of any suitable form of paper, fabric or the like in any suitable width combined with a section or sections of highly transparent material of suitable width whereby such composite bag forming material is provided with a transparent zone or area, and for this purpose I have combined one or more sections of paper or the like, with one or more sections of a highly transparent film or pellicle which may be of any well-known cellulosic type or of any other suitable and substantially similar material. While I have employed a well-known article of commerce as the transparent film or pellicle in the manufacture of my improved composite bag forming material, it will be understood that other well-known transparent films or pellicles among which may be mentioned "glassine" and "crystalline", may be employed without departing from my invention.

In order that the structure of my improved bag may be more clearly understood and the manner in which it is made fully indicated I have illustrated and will describe different constructions of composite sheet material of which bags embodying my invention may be made. This material as illustrated consists of strips of paper and either of one strip of transparent material as illustrated in Fig. 1, or a plurality of strips of transparent material as illustrated in Fig. 2. Such composite sheet material is preferably formed from independent strips of material, transparent and otherwise, which may be delivered from suitable rolls in such manner and in such relation to each other that adhesive applied to certain edge portions of said strips will effect permanent connection of the same when the said edges are brought into overlapping relation and preferably subjected to suitable pressure.

It is essential that the composite material from which my improved bags are made is of a character that may be readily and successfully passed through bag-forming machines of the usual type. In practice, the composite sheet material is delivered to the tube-forming mechanism of bag-machines wherein the outer free edges of the composite sheets are brought into overlapping position and secured together by suitable adhesive in the usual manner.

In Fig. 1, of the drawings I have illustrated one form of a composite sheet from which my improved bags may be made comprising strips of suitable material, paper of any suitable type, indicated at A, A, with an intermediate strip B, of transparent material, which may be the cellulose hydrate of commerce, or any similar transparent strip, having its edges permanently secured to the edges of said strips A, A. This view illustrates the edges of the transparent strip B as overlying the edges of the laterally disposed strips A, A, although it will be understood that this arrangement may be reversed, if desired.

In Fig. 2, I have shown another form of composite sheet material which may be made up of more than two strips of paper or like material, in this instance three, indicated at A′, A′, A′, and more than one strip of transparent material, in this instance two, indicated at B′, B′.

In Fig. 3 I have shown a composite sheet of bag-forming material made up of a single strip of paper or similar material A², and a single strip of the transparent material, indicated at B², which material may be employed in carrying out my improved method of making paper bags.

In Fig. 4 I have illustrated, diagrammatically, one manner in which the composite sheet of bag-forming material illustrated in Fig. 1 may be produced; 1 and 2 representing rolls of paper, fabric or other suitable material, delivering the strips indicated at A, A, and 3 a roll delivering the strip of transparent material, indicated at B. Suitable adhesive-applying disks 4, disposed in a receptacle 5, may be arranged to engage the edges of the strips A, A, and apply a film of adhesive whereby they may be joined to the edges of the intermediate transparent strip B; the several connected strips forming the composite sheet material preferably passing between a pair of rolls 8 and 9, whose pressure will insure permanent adhesion of the edges.

In Fig. 5 I have illustrated another manner of producing the composite bag-forming sheet. In the arrangement illustrated in Fig. 4, the strip of transparent material B is so arranged with respect to the other strips A, A, that its edges overlap the edges of the latter strips, in the manner indicated in Fig. 1. In the arrangement illustrated in Fig. 5, however, the strip of transparent material B is so arranged with respect to the strips A, A, that the edges of the latter overlap the edges of said strip B. Although not illustrated in Fig. 5 it will be understood that the composite strip produced is or may be delivered to tube-forming mechanism and from the latter is continued to severing and bag-forming mechanism of usual known construction. My improved method may be employed in the making of bags from either form of the composite sheet material, and it will be understood that the sheets of bag-forming material illustrated in Figs. 2 and 3 may be made in a manner exactly similar to that employed for making the composite sheet illustrated in Fig. 1, or in the alternate manner indicated.

Although I have described the composite sheets of which bags and other containers may be made as being formed or manufactured upon machines—and in commercial practice the use of machines would be necessary—yet in so far as my invention is concerned, it is immaterial whether the composite sheets be formed or manufactured upon a machine or whether they be produced manually.

After passing the former and being shaped into the tube illustrated in Fig. 6, the upper edge of which adheres to the lower by means of the line of paste indicated at $a$, and applied by a disk $4^a$, disposed in a receptacle $5^a$, the tube passes between the "drawing rolls" (as they are called in this art) 10, and thence to cut-off mechanism whereby the blanks $x$ are produced; the latter being formed into finished bags by applying a transverse line of paste $a'$ after the severing operation, folding the ends of the blanks receiving such transverse line of paste, and pressing such folded ends against one side of the blanks.

The bags shown at C, in Figs. 7 and 8, are of a type mechanically produced, and while bags may be made by my improved method from any form of my improved composite material, those shown in said views are represented as made from composite sheet material of the character illustrated in Fig. 1; the bag shown in Fig. 7, having its continuous transparent area or zone $b$ centrally disposed, while the bag shown in Fig. 8, has its continuous transparent area or zone $b'$ at one side of its face. In the latter form, the space adjacent the continuous transparent portion of the bag face may receive printed matter indicating the contents of the bag, or other information, although it will be understood that such transparent material may also receive printed matter.

The package D, illustrated in Fig. 9, comprises a bag of a well known type, made according to my improved method of composite sheet material of the character illustrated in Fig. 2, which comprises a plurality of strips of paper or other suitable material and a plurality of transparent strips. Preferably these latter strips should be highly transparent. The transparent portions of the composite material employed for this bag are so disposed that the finished article will have oppositely disposed zones or areas $b^2$ of transparent material, extending the full length of the bag, through which the contents of such bag may be viewed; while the other walls may receive printed matter.

While I refer to the use of strips of paper in combination with strips of transparent material, it will be understood that the less transparent portion or portions of the composite sheet material made in accordance with my invention and from which bags may be produced in the manner described, may be of an suitable strip of paper, fabric, or the like, and that the transparent portion or portions may be of any suitable material, a cellulosic or other body, having preferably a high degree of transparency and capable of permanent engagement with the paper or other strips constituting the other part of such composite material by the aid of a suitable adhesive.

I do not wish to be limited to the use of cellulose hydrate as the transparent portion of my improved composite bag-forming material because I may employ the so-called "crystalline" or "glassine" of commerce, or any other transparent film or pellicle which is sufficiently flexible to render it capable, when permanently associated with the other portions making up the composite sheet material, of passing through a bag machine of the usual or ordinary type wherein such composite sheet material may be fashioned into the usual tubes from which bags of any commercial form are produced.

As this application contains matter in common with and divisible from my application for patent filed April 11, 1928, under Serial Number 269,231, it is to be considered as a division of such prior application.

I claim:

1. The herein described process for the manufacture of paper bags from composite material having a full length transparent area, which consists in feeding a plurality of continuous strips, one at least of which is highly transparent, to a common point whereby adjacent marginal edges of said strips may overlap; applying adhesive along the marginal edges of certain of said strips in advance of said meeting relation, bringing the outer marginal edges of the composite sheet into overlapping position, effecting permanent union of said overlapped marginal edges through the medium of the interposed layers of adhesive; developing said composite material into tube formation, and forming bags from successively severed portions of such tubing; said bags having a full-length panel of transparent material.

2. The herein described process for the manufacture of paper bags from composite material having a full length transparent area, which consists in feeding a plurality of continuous sections of paper and a continuous section of highly transparent material to a common point whereby adjacent marginal edges of the paper may overlap opposite marginal edges of the section of highly transparent material, applying adhesive to the marginal edges of certain of said paper strips in advance of said meeting relation, bringing the respective marginal edges of the highly transparent material and the paper into overlapping position, effecting permanent union of said overlapped marginal edges through the medium of the interposed layers of adhesive, developing said composite material into tube formation, and forming bags from successively severed portions of such tubing; said bags having a full-length panel of highly transparent material.

3. The method of making paper bags having transparent panels extending from end to end thereof which consists in presenting independent strips of paper and highly transparent material in spaced relation with marginal edges of the paper in overlapped position with respect to opposite marginal edges of the highly transparent material, applying adhesive to the marginal edges of the paper, bringing said marginal edges of the paper into contact with the marginal edges of the highly transparent material, effecting permanent union of said marginal edges through the medium of the interposed layers of adhesive, developing said composite material into tube formation, applying adhesive transversely to said tubing at regular intervals to define the formation of bag blanks therefrom, severing the tubing beyond the lines of transversely applied adhesive, and turning said portions of tubing containing the transversely applied adhesive upon successive blanks to form the bottoms and complete the bags.

In witness whereof I have signed this specification.

THOMAS M. ROYAL.